United States Patent
Aga

(10) Patent No.: US 6,618,663 B2
(45) Date of Patent: Sep. 9, 2003

(54) BRAKING FORCE CONTROL-TYPE BEHAVIOR CONTROL APPARATUS AND METHOD OF MOTOR VEHICLE

(75) Inventor: Masami Aga, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/877,208

(22) Filed: Jun. 11, 2001

(65) Prior Publication Data

US 2003/0036840 A1 Feb. 20, 2003

(30) Foreign Application Priority Data

Jun. 26, 2000 (JP) .......................... 2000-191131

(51) Int. Cl.$^7$ ............................................... B60T 7/12
(52) U.S. Cl. ............................................ 701/83; 701/70
(58) Field of Search .............................. 701/83, 1, 41, 701/65, 70, 73, 78, 80

(56) References Cited

U.S. PATENT DOCUMENTS

| 5,657,229 | A | * | 8/1997 | Naito et al. .................. 701/71 |
| 5,813,732 | A | | 9/1998 | Monzaki et al. |
| 6,416,140 | B1 | * | 7/2002 | Yamamoto et al. ......... 303/122 |
| 6,450,281 | B1 | * | 9/2002 | Kohler et al. ............... 180/197 |

* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

An apparatus and method for controlling a behavior of a vehicle apply a braking force to at least one predetermined wheel of the vehicle when the vehicle undergoes an undesirable behavior, such as a spin or a drift-out. The apparatus and method control a rate of reduction of the braking force to be smaller with an increase in a degree of deceleration of the vehicle caused by application of the braking force to the predetermined wheel.

16 Claims, 5 Drawing Sheets

BRAKING FORCE CONTROL-TYPE BEHAVIOR CONTROL APPARATUS AND METHOD OF MOTOR VEHICLE

INCORPORATION BY REFERENCE

The disclosure of Japanese Patent Application No. 2000-191131 filed on Jun. 26, 2000, including the specification, drawings and abstract, is incorporated herein by reference in its entirety.

BACKGROUND OF THE INVENTION

1. Field of Invention

The invention relates to a behavior control apparatus and method for a motor vehicle, such as an automobile, or the like. More particularly, the invention relates to such a behavior control apparatus and method for controlling vehicle behavior through control of braking force.

2. Description of Related Art

As one type of behavior control apparatus of a vehicle, such as an automobile, or the like, a braking force control-type behavior control apparatus as disclosed in U.S. Pat. No. 5,813,732 has been well known in the art. When a vehicle undergoes an unfavorable or undesirable behavior, such as a spin or a drift-out, the behavior control apparatus of this type operates to apply braking force to a certain wheel or wheels, so as to suppress or prevent the undesirable behavior.

More specifically, when the vehicle behaves in an undesirable manner, for example, when the vehicle is brought into a spin state or a drift-out state, the behavior control apparatus of the above type operates to automatically apply braking force to a suitable wheel or wheels so as to decelerate the vehicle or apply a yaw moment to the vehicle in such a direction as to suppress the undesirable behavior. Thus, the control apparatus automatically suppresses the undesirable behavior without requiring any special maneuver to be performed by a vehicle operator or driver.

In the conventional braking force control-type behavior control apparatus as described above, the braking force applied to a suitable wheel or wheels is generally controlled in accordance with the degree of the undesirable behavior. Therefore, in a situation where the vehicle behavior suddenly deteriorates, a large amount of braking force is rapidly applied to the wheel or wheels in question, and then the braking force is relatively rapidly reduced as the vehicle behavior stabilizes. Hence, the deceleration of the vehicle sharply increases, and then relatively sharply decreases, resulting in pitching of the vehicle, which may cause a passenger of the vehicle to feel uncomfortable.

To solve the above-described problem, the braking force applied to a suitable wheel or wheels in accordance with the degree of the undesirable behavior may be controlled to a reduced value by, for example, setting a control gain to a relatively low value. In this case, however, the effect of the behavior control is reduced, and the undesirable behavior of the vehicle cannot be effectively and surely suppressed or prevented.

SUMMARY OF THE INVENTION

It is therefore an object of the invention to provide a braking force control type vehicle behavior control apparatus which is able to prevent a sharp reduction in the braking force that was increased to a large magnitude under behavior control, and thereby effectively and reliably prevent pitching of the vehicle that would be otherwise caused by the behavior control, without sacrificing the effect of the behavior control.

To accomplish the above and/or other object(s), one aspect of the invention provides a behavior control apparatus for controlling a behavior of a vehicle, in which a controller applies a braking force to at least one predetermined wheel of the vehicle when the vehicle undergoes an undesirable behavior, and controls a rate of reduction of the braking force to be smaller with an increase in a degree of deceleration of the vehicle caused by application of the braking force to the at least one predetermined wheel.

With the control apparatus constructed as described above, the rate of reduction of the braking force is reduced when the degree of deceleration of the vehicle is relatively high, as compared with when the degree of deceleration is relatively low. It is therefore possible to effectively and surely prevent pitching of the vehicle, which would otherwise occur due to a sharp reduction in the braking force that previously was increased by a large degree under behavior control. Also, the braking force applied to the predetermined wheel under behavior control is not reduced, and therefore the undesirable behavior of the vehicle can be effectively and surely suppressed or prevented.

In one preferred embodiment of the invention, the controller sets an upper limit value of the rate of reduction of the braking force to a smaller value as the braking force applied to the predetermined wheel increases, thereby to reduce the rate of reduction of the braking force.

In the above embodiment, the upper limit value of the rate of reduction of the braking force is set to a smaller value as the braking force applied to the predetermined wheel increases, so that the rate of reduction of the braking force is reduced. It is thus possible to reduce the rate of reduction of the braking force in accordance with the braking force applied to the predetermined wheel, without requiring calculation of the deceleration of the vehicle. Also, since the upper limit value of the rate of reduction of the braking force increases with a reduction in the braking force, the rate of reduction of the braking force gradually increases as the braking force decreases. Accordingly, in the course of reduction of the braking force applied to the predetermined wheel, the application of the braking force under the behavior control can be finished sooner, as compared with the case where the braking force applied to the wheel is reduced at a fixed or constant small rate.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
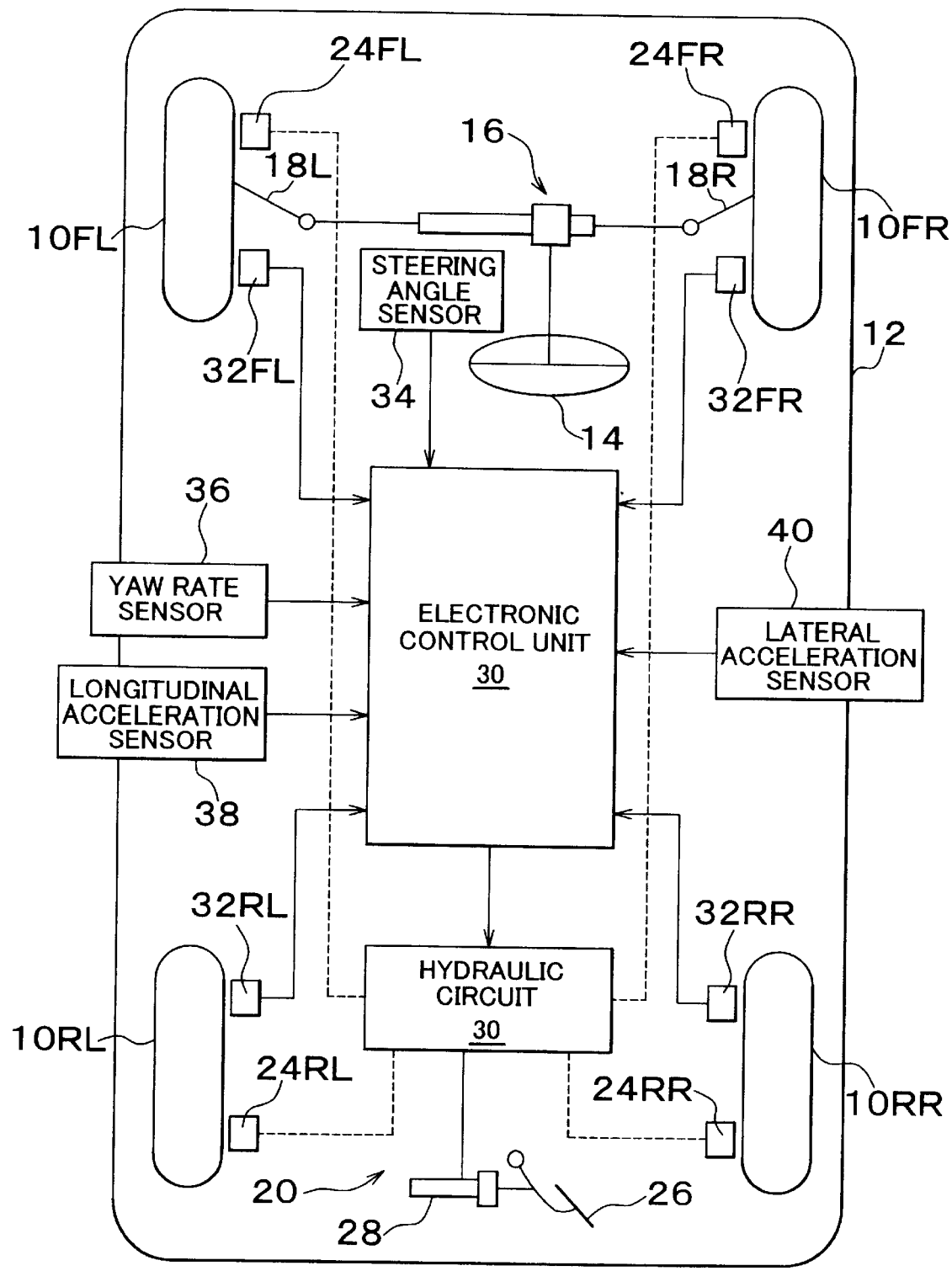
FIG. 1 is a schematic diagram illustrating the construction of a vehicle behavior control apparatus according to a preferred embodiment of the invention.

FIG. 1 is a schematic diagram illustrating the construction of a vehicle behavior control apparatus according to a preferred embodiment of the invention.

Referring to FIG. 1, a vehicle 12 has right and left front wheels 10FR, 10FL that are driven wheels, and right and left rear wheels 10RR, 10RL that are drive wheels. The right and left front wheels 10FR, 10FL are used for steering the vehicle when receiving steering forces from a rack-and-pinion type power steering device 16 via tie rods 18R, 18L, respectively. The power steering device 16 is driven in response to a turn of a steering wheel 14 caused by a vehicle operator or driver.

Braking forces on the respective wheels are controlled by controlling braking pressures applied to wheel cylinders 24FR, 24FL, 24RR, 24RL through a hydraulic circuit 22 of a braking device 20. Although not shown in FIG. 1, the hydraulic circuit 22 includes an oil reservoir, an oil pump, various valve devices, such as pressure-change control valves for increasing or reducing pressures in the wheel cylinders, and so on. The braking pressure applied to each wheel cylinder is normally controlled by a master cylinder 28 that is driven in accordance with driver's operations to depress a brake pedal 26. The braking pressure applied to each wheel cylinder is also controlled as needed, through duty-ratio control of the pressure-change control valves performed by an electronic control unit 30, as described later in greater detail.

The wheels 10FR, 10FL, 10RR and 10RL are provided with wheel speed sensors 32FR, 32FL, 32RR and 32RL for detecting wheel speeds Vwi (i=fr, fl, rr, rl) of the corresponding wheels. A steering column to which the steering wheel 14 is connected is provided with a steering angle sensor 34 for detecting the steering angle $\theta$.

The vehicle 12 further includes a yaw rate sensor 36 for detecting the yaw rate $\gamma$ of the vehicle, a longitudinal acceleration sensor 38 for detecting the longitudinal acceleration Gx, and a lateral acceleration sensor 40 for detecting the lateral acceleration Gy. The steering angle sensor 34, the yaw rate sensor 36 and the lateral acceleration sensor 40 detect the steering angle, the yaw rate and the lateral acceleration, respectively, with the direction of a left turn of the vehicle being defined as the positive direction.

As indicated in FIG. 1, the electronic control unit 30 receives signals indicative of the wheel speeds Vwi detected by the wheel speed sensors 32FR, 32FL, 32RR and 32RR, a signal indicative of the steering angle $\theta$ detected by the steering angle sensor 34, a signal indicative of the yaw rate $\gamma$ detected by the yaw rate sensor 36, a signal indicative of the longitudinal acceleration Gx detected by the longitudinal acceleration sensor 38, and a signal indicative of the lateral acceleration Gy detected by the lateral acceleration sensor 40.

Although not illustrated in detail in the drawings, the electronic control unit 30 includes a generally structured microcomputer that has, for example, a CPU, a ROM, a RAM, and input and output port devices, which are interconnected by a bidirectional common bus.

Figure 2:
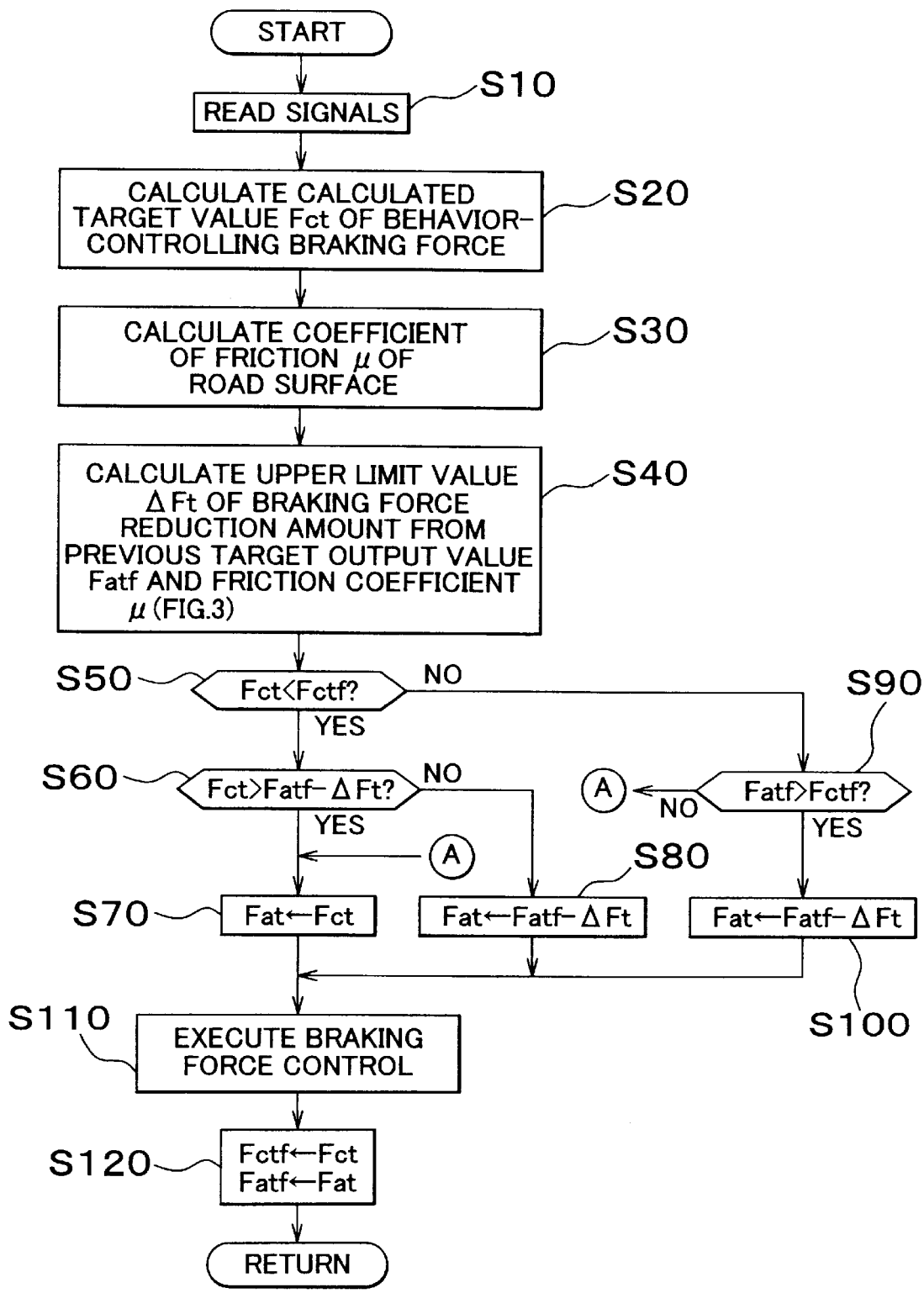
FIG. 2 is a flowchart illustrating a behavior control routine executed by the behavior control apparatus of the embodiment of FIG. 1.

The electronic control unit 30 operates to determine the behavior (e.g., steering behavior) of the vehicle. If the behavior of the vehicle is an undesirable or unfavorable behavior, the electronic control unit 30 calculates a target output value "Fat" of behavior-controlling braking force for each of the wheels to which braking force needs to be applied so as to suppress the undesirable behavior, depending upon the state of the undesirable behavior, in accordance with the flowchart as shown in FIG. 2. In this specification, the wheels that need to receive the behavior-controlling braking force will be called "wheels to be controlled".

In this case, the target output value "Fat" of behavior-controlling braking force may be calculated by any method known in the art. For example, a spin quantity "SS" representing the degree of a spin of the vehicle, and a drift-out quantity "DS" representing the degree of a drift-out of the vehicle are calculated based on the running state of the vehicle. Based on the spin quantity "SS" and the drift-out quantity "DS", a target braking force "Fsat" for controlling a turn behavior is calculated. Furthermore, a roll evaluation value "RV" representing the degree and direction of rolling of the vehicle is calculated, and a target braking force "Frat" for suppressing rolling is calculated based on an absolute value of the roll evaluation value "RV". The larger one of the target braking forces "Fsat" and "Frat" is set as a target output value "Fat" of the behavior-controlling braking force.

When the vehicle turns and spins, for example, a braking force is applied to the front wheel on the outside of the turn, which is a wheel to be controlled in this case, so that the vehicle is decelerated and a yaw moment is applied to the vehicle in a direction to suppress or prevent the spin. When the vehicle undergoes a drift-out, braking forces are applied to the right and left rear wheels, or the right and left rear wheels and the front wheel on the outside of the turn, so that the vehicle is decelerated and the drift-out is suppressed or prevented. When the vehicle rolls by an excessively large degree, for example, braking forces are applied to the front wheel on the outside of the turn and to the right and left rear wheels. As a result, the vehicle is decelerated, and the radius of the turn of the vehicle is increased so that the centrifugal force that acts on the vehicle is reduced, whereby the degree of rolling of the vehicle body is reduced. It is to be noted that the wheel(s) to be controlled when the vehicle behavior is a spin may be the rear wheel on the outside of the turn or the right and left rear wheels, rather than the front wheel on the outside of the turn.

The electronic control unit 30 calculates a target slip rate "Rst" of each of the wheel(s) to which braking force needs to be applied, based on the target output value "Fat" of the controlling braking force. Based on the target slip rate "Rst", the electronic control unit 30 controls the pressure change control valve of each wheel, so that the slip rate of the wheel becomes equal to the target slip rate "Rst". In this manner, the electronic control unit 30 performs behavior control for stabilizing the behavior of the vehicle.

While the target output value "Fat" of the controlling braking force is decreasing, the electronic control unit 30 controls the rate of reduction of the braking force in accordance with the braking force that is being applied to the wheel to be controlled, so that the rate of reduction of the braking force becomes smaller as the braking force applied to the wheel to be controlled is greater. This prevents the braking force for the behavior control from being abruptly or sharply reduced, and thus avoids pitching of the vehicle due to the abrupt reduction of the braking force.

In this embodiment, in particular, the electronic control unit 30 estimates a coefficient of friction $\mu$ of a road surface, based on the longitudinal acceleration Gx and the lateral acceleration Gy of the vehicle. The electronic control unit 30 then controls the rate of reduction of the braking force, based on the friction coefficient of the road surface as well, so that the rate of reduction of the braking force becomes smaller as the friction coefficient $\mu$ of the road surface is higher.

A behavior control routine in this embodiment will be described with reference to the flowchart as shown in FIG. 2. The flowchart shown in FIG. 2 is started upon turn-on of an ignition switch (not shown in FIG. 1), and is executed at predetermined intervals. Each of step S20 and the subsequent steps is executed with respect to each wheel to be controlled.

Step S10 is initially executed to read signals indicating the wheel speeds Vwi and other signals. Prior to step S20, it is determined whether the current vehicle behavior is an undesirable or unfavorable behavior, based on the spin quantity "SS" and the like. If the vehicle behavior is stable, the process returns to step S10. If the vehicle behavior is an undesirable one, the process proceeds to step S20, and a target output value of behavior-controlling braking force for suppressing the undesirable behavior is calculated, and the result of calculation is set as a calculated target value "Fct".

In step S30, a coefficient of friction $\mu$ of the road surface is calculated from the longitudinal acceleration Gx and the lateral acceleration Gy of the vehicle according to the following expression (1). It is, however, to be understood that the road-surface friction coefficient $\mu$ may be calculated by any method known in the art. Furthermore, since an approximate value of the road-surface friction coefficient $\mu$ is sufficient to practice the invention, the road-surface friction coefficient $\mu$ may also be detected by a friction coefficient sensor.

$$\mu = (Gx^2 + Gy^2)^{1/2} \quad (1)$$

Figure 3:
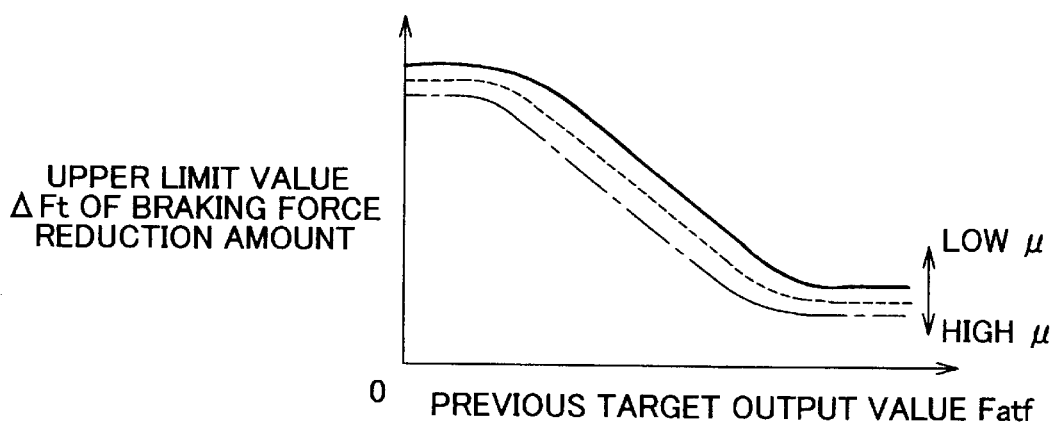
FIG. 3 is a graph indicating the relationship among the previous target output value "Fatf" of behavior-controlling braking force, the road-surface friction coefficient $\mu$, and the upper limit value "$\Delta$Ft" of the braking force reduction amount.

In step S40, an upper limit value "$\Delta$Ft" (positive value) of the amount of reduction of the braking force is calculated from the target output value "Fatf" of the behavior-controlling braking force obtained in the last control cycle and the road-surface friction coefficient $\mu$, with reference to a map corresponding to the graph of FIG. 3. As is apparent from FIG. 3, the upper limit value "$\Delta$Ft" of the braking force reduction amount decreases with an increase in the previous target output value "Fatf" of the behavior-controlling braking force, and also decreases with an increase in the road-surface friction coefficient $\mu$.

In step S50, it is determined whether the calculated target value "Fct" of the behavior-controlling braking force obtained in step S20 is smaller than the calculated target value "Fctf" obtained in the last control cycle, namely, whether the behavior-controlling braking force is decreasing. If a negative decision (NO) is obtained in step S50, the process proceeds to step S90. If an affirmative decision (YES) is obtained in step S50, the process proceeds to step S60.

In step S60, it is determined whether the calculated target value "Fct" is greater than the value obtained by subtracting the upper limit value "$\Delta$Ft" of the reduction amount from the target output value "Fatf" obtained in the last cycle, namely, whether the magnitude of the target amount of reduction of the behavior-controlling braking force is less than the upper limit value "$\Delta$Ft" of the reduction amount. If an affirmative decision (YES) is obtained in step S60, the process proceeds to step S70 in which the calculated target value "Fct" is set as a target output value "Fat" of the behavior-controlling braking force. If a negative decision "NO" is obtained in step S60, the process proceeds to step S80 in which the above-indicated value obtained by subtracting the upper limit value "$\Delta$Ft" of the reduction amount from the target output value "Fatf" obtained in the last cycle is set as a target output value "Fat".

In step S90, it is determined whether the target output value "Fatf" obtained in the last cycle is greater than the calculated target value "Fctf" obtained in the last cycle, namely, whether the calculated target value "Fct" of the behavior-controlling braking force is not decreasing but the behavior-controlling braking force must be kept reduced. If a negative decision (NO) is obtained in step S90, the process proceeds to step S70. If an affirmative decision (YES) is obtained in step S90, the process proceeds to step S100 in which the value obtained by subtracting the upper limit value "$\Delta$Ft" of the reduction amount from the previous target output value "Fatf" is set as a target output value "Fat".

In step S110, a target slip rate "Rst" of the wheel to be controlled is calculated from the target output value "Fat", and the hydraulic circuit 22 is controlled so that the slip rate of the wheel in question becomes equal to the target slip rate "Rst". Thus, a braking force corresponding to the target output value "Fat" is applied to the wheel to be controlled, so that the vehicle behavior is appropriately controlled.

In step S120, the calculated target value "Fct" determined in the current cycle is set as a calculated target value "Fctf" of the behavior-controlling braking force for use in the next control cycle. Similarly, the target output value "Fat" obtained in the current cycle is set as a target output value "Fatf" for use in the next control cycle. After executing step S120, the process returns to step 10.

According to the embodiment, a target output value of the behavior-controlling braking force for suppressing an undesirable behavior of the vehicle is calculated in step S20. In steps S30 and S40, on the basis of the previous target output value "Fatf" of the behavior-controlling braking force and the road-surface friction coefficient $\mu$, namely, on the basis of the braking force currently applied to the wheel to be controlled, the upper limit value "$\Delta$Ft" of the amount of reduction in the braking force is calculated so that the upper limit value "$\Delta$Ft" becomes smaller as the braking force currently applied to the wheel is larger.

If the behavior-controlling braking force is decreasing, an affirmative decision (YES) is obtained in step S50. If the magnitude of the target amount of reduction in the behavior-controlling braking force is less than the upper limit value "$\Delta$Ft" of the reduction amount, an affirmative decision (YES) is obtained in step S60. Then in step S70, the calculated target value "Fct" is set as a target output value "Fat". Conversely, if the magnitude of the target amount of reduction in the behavior-controlling braking force is equal to or greater than the upper limit value $\Delta$Ft of the reduction amount, a negative decision (NO) is obtained in step S60. Then in step S80, the value obtained by subtracting the upper limit value "$\Delta$Ft" from the previous target output value "Fatf" is set as a target output value "Fat". In this manner, the amount of reduction in the behavior-controlling braking force is restricted by the upper limit value "$\Delta$Ft".

Thus, when the rate of reduction in the target output value "Fat" of the behavior-controlling braking force is larger than a certain value, the rate of reduction is restricted to a value corresponding to the upper limit value "$\Delta$Ft" of the amount of reduction in the braking force, so that the braking force applied to the wheel to be controlled is prevented from being abruptly or sharply reduced. Consequently, pitching of the vehicle that would be otherwise caused by a sharp reduction in the deceleration of the vehicle can be certainly prevented.

Figure 4:
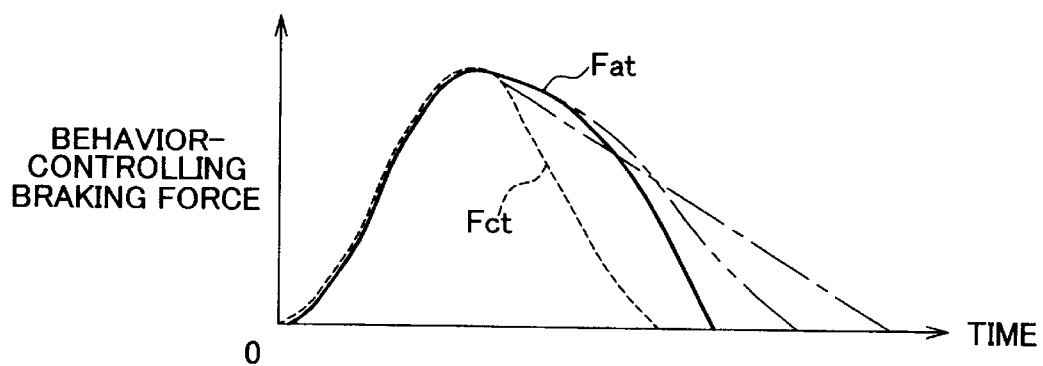
FIG. 4 is a graph indicating an example of changes in the calculated target value and target output value of the behavior-controlling braking force in a case where the vehicle behavior suddenly deteriorates and then rapidly improves.

For example, in FIG. 4, a broken line indicates changes in the calculated target value "Fct" of the behavior-controlling braking force when the vehicle behavior suddenly deteriorates and then relatively rapidly becomes stable. A solid line in FIG. 4 indicates changes in the target output value "Fat" of the behavior-controlling braking force in the same situation. It will be apparent from the comparison between these two lines that according to this embodiment, the behavior-controlling braking force is reduced at a relatively low rate, in particular, during an early period of the reduction of the braking force, as shown in FIG. 4. This makes it possible to surely avoid a situation in which the braking force rapidly increases and then rapidly decreases.

Furthermore, according to the embodiment, the upper limit value "ΔFt" of the amount of reduction in braking force becomes smaller as the target output value "Fatf" of the behavior-controlling braking force obtained in the last cycle increases. In other words, the upper limit value "ΔFt" of the reduction amount increases with decreases in the previous target output value "Fatf" of the behavior-controlling braking force. Hence, as indicated in FIG. 4 by way of example, the rate of reduction in the behavior-controlling braking force increases gradually as the braking-force decreasing process proceeds with time.

Accordingly, the behavior-controlling braking force can be quickly reduced, as compared with, for example, the case where the rate of reduction of the behavior-controlling braking force is controlled to a fixed low value (namely, the braking force is reduced at a constant low rate), as indicated by a one-dot chain line in FIG. 4, and the case where the rate of reduction of the behavior-controlling braking force is reduced through a filtering process or the like, as indicated by a two-dot chain line in FIG. 4. It is thus possible to return brake control, as quickly as possible, to a normal control state in which the braking forces on the wheels are controlled in accordance with the braking operation of the vehicle operator or driver, while at the same time avoiding a rapid reduction in the deceleration of the vehicle.

In general, even with the same braking force control quantity (e.g., the same braking pressure of a braking force generating mechanism) applied to a certain wheel, the braking force actually generated by the wheel increases with increases in the road surface friction coefficient. According to the embodiment, in particular, the upper limit value "ΔFt" of the amount of reduction in the braking force is calculated in such a manner that the upper limit value "ΔFt" becomes smaller as the previous target output value "Fatf" of the behavior-controlling braking force is higher, and also becomes smaller as the coefficient of friction $\mu$ of the road surface is higher. It is thus possible to more reliably prevent a sharp reduction in the deceleration of the vehicle and therefore avoid pitching of the vehicle caused by such a sharp reduction in the vehicle deceleration, as compared with the case where the friction coefficient $\mu$ of the road surface is not taken into consideration.

Still further, according to the embodiment, even while the calculated target value "Fct" of the behavior-controlling braking force is not decreasing, it is determined in step S90 whether the vehicle is in such a condition that the behavior-controlling braking force must continue to be reduced. If an affirmative decision (YES) is obtained in step S90, the target output value "Fat" of the behavior-controlling braking force is reduced at a rate corresponding to the upper limit value "ΔFt" of the reduction amount. It is thus possible to surely prevent a sharp reduction in the braking force that would otherwise occur when the target output value Fat of the behavior-controlling braking force is set to the calculated target value Fct after the calculated target value Fct of the behavior-controlling braking force stops decreasing. Consequently, pitching of the vehicle due to such a sharp reduction in the braking force can be certainly prevented.

Figure 5:
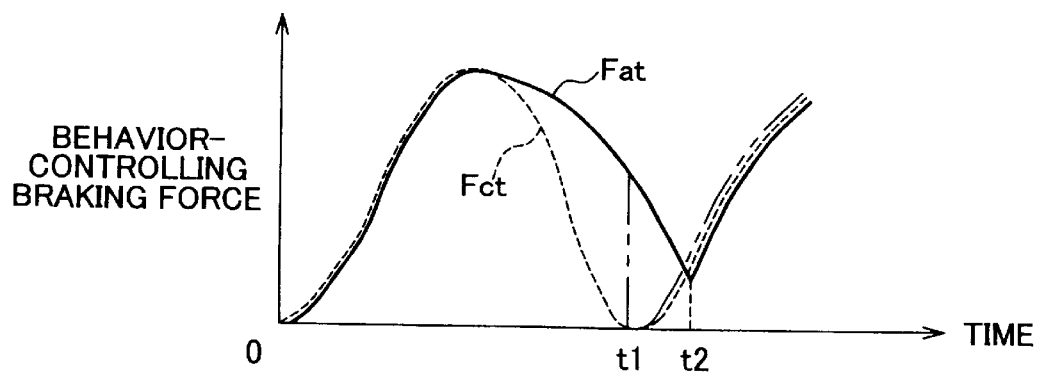
FIG. 5 is a graph indicating an example of changes in the calculated target value and the target output value of the behavior-controlling braking force in a case where undesirable vehicle behavior repeatedly takes place.

FIG. 5 shows, by way of example, changes in the calculated target value "Fct" (as represented by a broken line) and the target output value "Fat" (as represented by a solid line) of the behavior-controlling braking force in a case where the vehicle behavior deteriorates repeatedly. In FIG. 5, a two-dot chain line indicates changes in the target output value "Fat" in a case where step S70 is executed immediately after a negative decision (NO) is obtained in step S50. As is understood from FIG. 5, if the process proceeds to step S70 after a negative decision (NO) is obtained in step S50, the target output value "Fat" of the behavior-controlling braking force rapidly falls to zero at a point of time "t1" when the calculated target value "Fct" of the behavior-controlling braking force stops decreasing. As a result, a sharp reduction in the deceleration of the vehicle and pitching due to the sharp reduction inevitably take place. In contrast, according to the embodiment, the target output value "Fat" of the behavior-controlling braking force continues to gradually decrease even after the point of time "t1", until the target output value "Fat" becomes equal to the calculated target value "Fct" at a point of time "t2". Thus, the embodiment make it possible to surely prevent a sharp reduction in the deceleration of the vehicle and pitching of the vehicle, which would be otherwise caused by a sharp reduction of the target output value "Fat" down to zero.

While the preferred embodiment of the invention has been described above, for illustrative purpose only, it would be apparent to those skilled in the art that the invention is not limited to details of the illustrated embodiment, but may be embodied with various changes, modifications, or improvements, without departing from the scope of the invention.

Figure 6:
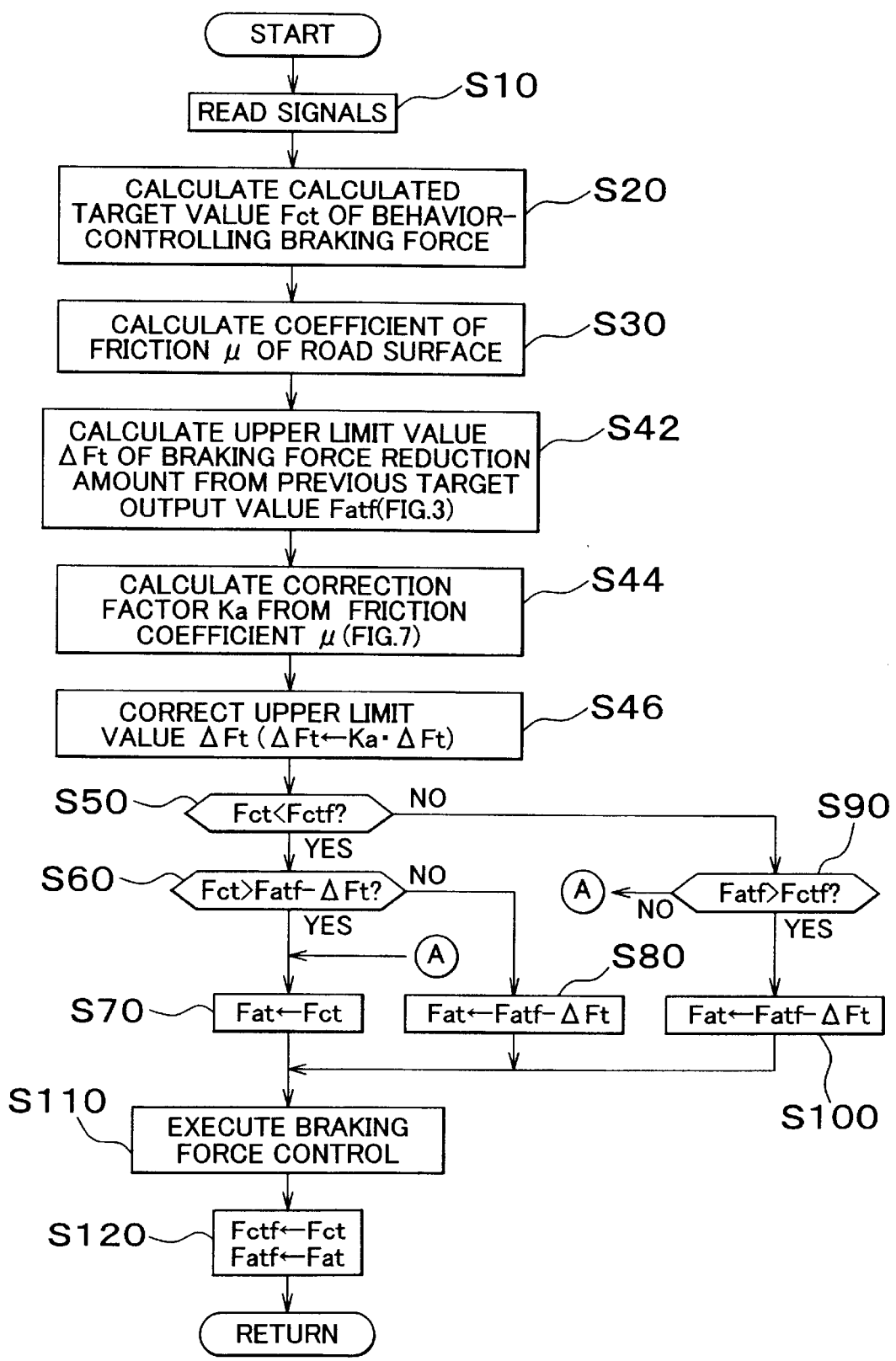
FIG. 6 is a flowchart illustrating a behavior control routine executed by a behavior control apparatus according to a modified example of the embodiment of FIG. 1.
Figure 7:
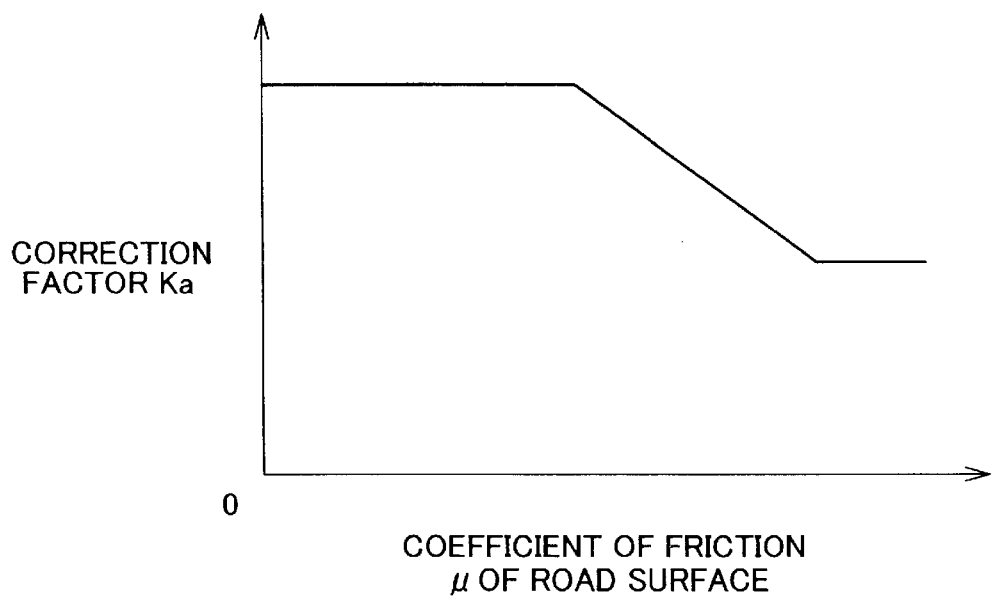
FIG. 7 is a graph indicating the relationship between the road surface friction coefficient $\mu$ and the correction factor "Ka".

In the illustrated embodiment, the upper limit value "ΔFt" of the amount of reduction in the braking force is calculated in step S40 so that the calculated upper limit value "ΔFt" becomes smaller as the previous target output value "Fatf" of the behavior-controlling braking force is larger and also becomes smaller as the coefficient of friction $\mu$ of the road surface is higher, and the amount of reduction in the behavior-controlling braking force is restricted by the upper limit value "ΔFt" in step S50 to step S100. However, the manner of determining the upper limit value "ΔFt" is not limited to that of the FIG. 1 embodiment, but may be modified. For example, as illustrated in FIG. 6, step S30 can be followed by step S42 in which the upper limit value "ΔFt" of the amount of reduction in the braking force is calculated with reference to a map corresponding to the curve as indicated by the solid line in FIG. 3 so that the calculated upper limit value becomes smaller as the previous target output value "Fatf" of the behavior-controlling braking force is larger. In the following step S44, a correction factor "Ka" is calculated with reference to a map corresponding to the graph of FIG. 7 so that the calculated correction factor "Ka" becomes smaller as the coefficient of friction $\mu$ of the road surface is higher. In step S46, the upper limit value "ΔFt" of the behavior-controlling braking force is corrected to be equal to "Ka·ΔFt". After executing step S46, the process proceeds to step S50.

Although the upper limit value "ΔFt" of the amount of reduction in the braking force is made smaller with an increase in the coefficient of friction μ of the road surface in the illustrated embodiment and its modified example as described above, the control apparatus of the invention may be constructed such that the upper limit value "ΔFt" of the braking force reduction amount does not vary (i.e., increase or decrease) depending upon the road-surface friction coefficient μ, but varies solely based on the previous target output value "Fatf". Namely, the upper limit value "ΔFt" of the braking force reduction amount is made smaller as the previous target output value "Fatf" of the behavior-controlling braking force is greater.

In the illustrated embodiment, the amount of reduction in the behavior-controlling braking force is restricted by the upper limit value ΔFt, so that the rate of reduction in the behavior-controlling braking force is controlled to be smaller as the braking force applied to the wheel to be controlled is greater. However, the control apparatus of the invention may employ other manners of reducing the rate of reduction in the behavior-controlling braking force. For example, in the course of decreasing the behavior-controlling braking force, the braking force may be gradually reduced with a certain time constant, such that the time constant is controlled to be greater as the peak value of the behavior-controlling braking force is higher, whereby the rate of reduction in the behavior-controlling braking force becomes smaller as the peak value of the behavior-controlling braking force is higher.

In the illustrated embodiment, the upper limit value "ΔFt" of the braking force reduction amount is calculated so that the calculated limit value becomes smaller as the previous target output value "Fatf" of the behavior-controlling braking force is greater, and also as the coefficient of friction μ of the road surface is higher, and the amount of reduction in the behavior-controlling braking force is limited to the upper limit value "ΔFt". In a modified example of this embodiment, the deceleration of the vehicle is estimated as "−Gx", based on the longitudinal acceleration "Gx" of the vehicle, and the upper limit value "ΔFt" of the braking force reduction amount is calculated to be smaller as the estimated deceleration "−Gx" of the vehicle is greater.

Furthermore, in the illustrated embodiment, the target slip rate "Rst" of a wheel to be controlled is calculated based on the target output value "Fat" of the behavior-controlling braking force, and the hydraulic circuit 22 is controlled so that the slip rate of the wheel in question becomes equal to the target slip rate "Rst". In this manner, a braking force corresponding to the target output value "Fat" is applied to the wheel to be controlled. However, the behavior control apparatus of the invention may be constructed such that a target braking pressure "Pst" applied to a wheel to be controlled is calculated based on the target output value "Fat" of the behavior-controlling braking force, and the hydraulic circuit 22 is controlled so that the braking pressure applied to the wheel in question becomes equal to the target braking pressure "Pst", and a braking force corresponding to the target output value "Fat" is applied to the wheel to be controlled.

As is apparent from the above description, according to the invention, it is possible to effectively and surely prevent pitching of the vehicle caused by a sharp reduction in the braking force which previously was increased to a large magnitude under the behavior control. Furthermore, according to the invention, the braking force applied to a wheel to be controlled under behavior control is not reduced, and therefore an undesirable behavior of the vehicle can be effectively and surely suppressed or prevented.

Furthermore, according to the invention, the rate of reduction in the braking force can be reduced in accordance with the braking force applied to a certain wheel, without requiring calculation of the deceleration of the vehicle. Also, the rate of reduction in the braking force can be gradually increased as the braking force decreases. Therefore, the application of the braking force under the behavior control can be finished sooner, as compared with the case where, for example, the braking force applied to the wheel to be controlled is reduced at a fixed or constant small rate.

In the illustrated embodiment, the controller (the electronic control unit 30) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A behavior control apparatus for controlling a behavior of a vehicle, comprising a controller that:

applies a braking force to at least one predetermined wheel of the vehicle when the vehicle undergoes an undesirable behavior; and controls a rate of reduction of the braking force to be smaller with an increase in a degree of deceleration of the vehicle caused by application of the braking force to the at least one predetermined wheel when the braking force applied to the at least one wheel is reduced.

2. A behavior control apparatus according to claim 1, wherein the controller sets an upper limit value of the rate of reduction of the braking force to a smaller value as the braking force applied to the at least one predetermined wheel increases, thereby reducing the rate of reduction of the braking force.

3. A behavior control apparatus according to claim 2, wherein the controller sets the upper limit value of the rate of reduction of the braking force to a smaller value as a coefficient of friction of a road surface on which the vehicle is running is higher.

4. A behavior control apparatus according to claim 1, wherein the braking force applied to the at least one predetermined wheel is controlled in accordance with a braking force control quantity, and wherein the controller sets an upper limit value of a rate of reduction of the braking force control quantity to a smaller value as the braking force control quantity associated with the at least one predetermined wheel is larger, thereby reducing the rate of reduction of the braking force.

5. A behavior control apparatus according to claim 4, wherein the braking force control quantity comprises a braking pressure applied to the at least one predetermined wheel.

6. A behavior control apparatus according to claim 4, wherein the controller sets the upper limit value of the rate of reduction of the braking force control quantity to a smaller value as a coefficient of friction of a road surface on which the vehicle is running is higher.

7. A behavior control apparatus according to claim 1, wherein the controller estimates the deceleration of the vehicle based on a longitudinal acceleration of the vehicle.

8. A behavior control apparatus according to claim 1, wherein the undesirable behavior includes at least one of an undesirable steering behavior and an undesirable roll behavior.

9. A method for controlling a behavior of a vehicle, comprising the steps of:

applying a braking force to at least one predetermined wheel of the vehicle when the vehicle undergoes an undesirable behavior; and controlling a rate of reduction of the braking force to be smaller with an increase in a degree of deceleration of the vehicle caused by application of the braking force to the at least one predetermined wheel when the braking force applied to the at least one predetermined wheel is reduced.

10. A method according to claim 9, wherein an upper limit value of the rate of reduction of the braking force is set to a smaller value as the braking force applied to the at least one predetermined wheel increases, so that the rate of reduction of the braking force is reduced.

11. A method according to claim 10, wherein the upper limit value of the rate of reduction of the braking force is set to a smaller value as a coefficient of friction of a road surface on which the vehicle is running is higher.

12. A method according to claim 9, wherein the braking force applied to the at least one predetermined wheel is controlled in accordance with a braking force control quantity, and wherein an upper limit value of a rate of reduction of the braking force control quantity is set to a smaller value as the braking force control quantity associated with the at least one predetermined wheel is larger, so that the rate of reduction of the braking force is reduced.

13. A method according to claim 12, wherein the braking force control quantity comprises a braking pressure applied to the at least one predetermined wheel.

14. A method according to claim 12, wherein the upper limit value of the rate of reduction of the braking force control quantity is set to a smaller value as a coefficient of friction of a road surface on which the vehicle is running is higher.

15. A method according to claim 9, wherein the deceleration of the vehicle is estimated based on a longitudinal acceleration of the vehicle.

16. A method according to claim 9, wherein the undesirable behavior includes at least one of an undesirable steering behavior and an undesirable roll behavior.

* * * * *